(12) United States Patent
Parikh et al.

(10) Patent No.: US 9,195,758 B2
(45) Date of Patent: Nov. 24, 2015

(54) SYSTEM AND METHOD FOR MULTI-DIMENSIONAL PERSONALIZATION OF SEARCH RESULTS

(75) Inventors: Nishith Parikh, Fremont, CA (US); Neelakantan Sundaresan, Mountain View, CA (US); Zeqian Shen, San Jose, CA (US)

(73) Assignee: eBay, Inc., San Jose, CA (US)

( * ) Notice: Subject to any disclaimer, the term of this patent is extended or adjusted under 35 U.S.C. 154(b) by 311 days.

(21) Appl. No.: 13/278,912

(22) Filed: Oct. 21, 2011

(65) Prior Publication Data

US 2013/0103672 A1  Apr. 25, 2013

(51) Int. Cl.
*G06F 17/30* (2006.01)

(52) U.S. Cl.
CPC .... *G06F 17/30867* (2013.01); *G06F 17/30522* (2013.01)

(58) Field of Classification Search
CPC ............. G06F 17/30648; G06F 17/30525; G06F 17/30536; G06F 17/30522
See application file for complete search history.

(56) References Cited

U.S. PATENT DOCUMENTS

| | | | |
|---|---|---|---|
| 6,313,833 B1 * | 11/2001 | Knight | 705/36 R |
| 2003/0065600 A1 * | 4/2003 | Terashima et al. | 705/36 |
| 2008/0033841 A1 * | 2/2008 | Wanker | 705/27 |
| 2008/0154898 A1 * | 6/2008 | Cheng et al. | 707/6 |
| 2010/0111281 A1 * | 5/2010 | Levine | 379/211.02 |
| 2011/0093361 A1 * | 4/2011 | Morales | 705/26.62 |
| 2012/0059819 A1 * | 3/2012 | Wheeler et al. | 707/723 |
| 2012/0150833 A1 * | 6/2012 | Parthasarathy et al. | 707/706 |
| 2012/0221562 A1 * | 8/2012 | Zhang et al. | 707/728 |

* cited by examiner

*Primary Examiner* — Miranda Huang
(74) *Attorney, Agent, or Firm* — Schwegman Lundberg & Woessner, P.A.

(57) ABSTRACT

In various example embodiments, a system and method for personalization of search results are provided. In example embodiments, a user interface that allows a user to establish optimization preferences used to personalize results based on a query is provided. The optimization preferences include values that are a portion of a total allowed value assigned to interrelated optimization factors. The optimization preferences are received via the user interface. The optimization preferences are applied to matches obtained based on the query to generate a personalized result set.

20 Claims, 8 Drawing Sheets

SYSTEM AND METHOD FOR MULTI-DIMENSIONAL PERSONALIZATION OF SEARCH RESULTS

FIELD

The present disclosure relates generally to searching, and in a specific example embodiment, to providing multi-dimensional personalization of search results.

BACKGROUND

Conventionally when users provide a query containing search terms to a search system, a search engine guesses the best results to return to the user. However, search terms typically have more than one meaning. For example, a search term "jaguar" may be directed to an animal or to a make of a car. Furthermore, search engines that focus merely on relevance will return results that may be the most popular at the moment. These results may not provide much variety leading to redundancy in the results.

BRIEF DESCRIPTION OF DRAWINGS

Various ones of the appended drawings merely illustrate example embodiments of the present invention and cannot be considered as limiting its scope.

DETAILED DESCRIPTION

Figure 1:
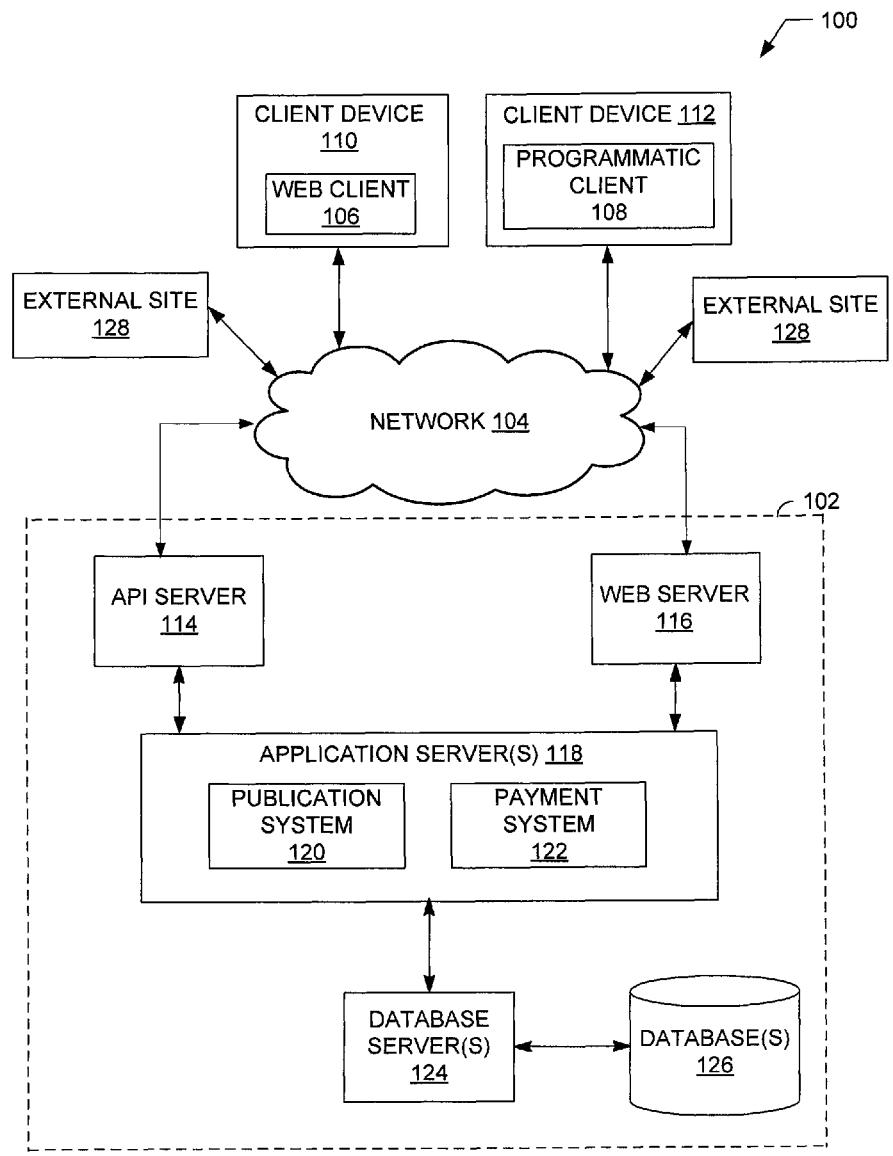
FIG. 1 is a block diagram illustrating an example embodiment of a network architecture of a system used to provide multi-dimensional personalization of search results.

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

As used herein, the term "or" may be construed in either an inclusive or exclusive sense. Additionally, although various example embodiments discussed below focus on a marketplace environment, the embodiments are given merely for clarity in disclosure. Thus, any type of electronic publication, electronic commerce, social networking, or electronic business system and method, including various system architectures, may employ various embodiments of the content system and method described herein and may be considered as being within a scope of example embodiments. Each of a variety of example embodiments is discussed in detail below.

Example embodiments described herein provide systems and methods for providing multi-dimensional personalized search results. In order to obtain a result set comprising diverse matches to a query, factors besides relevance are considered. In a marketplace environment, these factors may comprise, for example, price, trust, selection, customer service level, or condition of a product. The importance of these factors may differ for each user and requires a balance there between. For example, a product that provides 24 hour customer support is likely to cost more than a similar product that does not provide any customer support, or a brand new product is likely to cost more than a used version of the same product. As such, the user is provided an interface through which the user may indicate their optimization preferences. These optimization preferences are used when determining the result set to provide to the user based on a query.

Providing results specific to a user is particularly important because different users expect different results given the same query. Some users are willing to pay a higher price for guaranteed quality and exceptional service from a seller, while other users prefer a deal (e.g., lower price) and are willing to buy from non-professional sellers or buy used inventory.

Furthermore, search results may benefit from perturbation in order for new items to be included in the result set. Perturbation is a process by which a match which would not be normally included in the result set is added. In some embodiments, the match may be a random match or a match for a new or recently added item. Because the item is relatively new, the item may not rank highly in terms of relevance or trust. However, if the item is never or seldom returned in a result set, then the item may never have a chance of gaining relevance or trust. As such, the use of perturbation enhances the result set.

By using embodiments of the present invention, a user will obtain personalized search results that are more likely to satisfy the user. Accordingly, one or more of the methodologies discussed herein may obviate a need for repeated searching in order to obtain proper search results, which may have the technical effect of reducing computing resources used by one or more devices within the system. Examples of such computing resources include, without limitation, processor cycles, network traffic, memory usage, storage space, and power consumption.

With reference to FIG. 1, an example embodiment of a high-level client-server-based network architecture 100 to enable personalization of search results is shown. A networked system 102, in an example form of a network-server-side functionality, is coupled via a communication network 104 (e.g., the Internet, wireless network, cellular network, or a Wide Area Network (WAN)) to one or more client devices 110 and 112. FIG. 1 illustrates, for example, a web client 106 operating via a browser (e.g., such as the INTERNET EXPLORER® browser developed by Microsoft® Corporation of Redmond, Wash. State), and a programmatic client 108 executing on respective client devices 110 and 112.

The client devices 110 and 112 may comprise a mobile phone, desktop computer, laptop, or any other communication device that a user may utilize to access the networked system 102. In some embodiments, the client device 110 may comprise a display module (not shown) to display information (e.g., in the form of user interfaces). In further embodiments, the client device 110 may comprise one or more of a touch screen, accelerometer, camera, microphone, and GPS device. The client devices 110 and 112 may be a device of a user, which is used to provide optimization preferences or search terms of a query to the networked system 102. In one embodiment, the networked system 102 is a network-based marketplace that publishes publications comprising item listings of products for sale on the network-based marketplace and manages payments for these marketplace transactions.

An Application Program Interface (API) server 114 and a web server 116 are coupled to, and provide programmatic and web interfaces respectively to, one or more application servers 118. The application servers 118 host a publication system 120 and a payment system 122, each of which may comprise one or more modules, applications, or engines, and each of which may be embodied as hardware, software, firmware, or any combination thereof. The application servers 118 are, in turn, coupled to one or more database servers 124 facilitating access to one or more information storage repositories or database(s) 126. In one embodiment, the databases 126 are storage devices that store information to be posted (e.g., publications or listings) to the publication system 120. The databases 126 may also store account information for users in accordance with example embodiments.

In example embodiments, the publication system 120 publishes content on a network (e.g., Internet). As such, the publication system 120 provides a number of publication and marketplace functions and services to users that access the networked system 102. The publication system 120 is discussed in more detail in connection with FIG. 2. In example embodiments, the publication system 120 is discussed in terms of a marketplace environment. However, it is noted that the publication system 120 may be associated with a non-marketplace environment such as an informational (e.g., search engine) or social networking environment.

The payment system 122 provides a number of payment services and functions to users. The payment system 122 allows users to accumulate value (e.g., in a commercial currency, such as the U.S. dollar, or a proprietary currency, such as "points") in their accounts, and then later to redeem the accumulated value for products (e.g., goods or services) that are made available via the publication system 120 or elsewhere on the network 104. The payment system 122 also facilitates payments from a payment mechanism (e.g., a bank account, PayPal™, or credit card) for purchases of items via any type and form of a network-based marketplace.

While the publication system 120 and the payment system 122 are shown in FIG. 1 to both form part of the networked system 102, it will be appreciated that, in alternative embodiments, the payment system 122 may form part of a payment service that is separate and distinct from the networked system 102. Additionally, while the example network architecture 100 of FIG. 1 employs a client-server architecture, a skilled artisan will recognize that the present disclosure is not limited to such an architecture. The example network architecture 100 can equally well find application in, for example, a distributed or peer-to-peer architecture system. The publication system 120 and payment system 122 may also be implemented as standalone systems or standalone software programs operating under separate hardware platforms, which do not necessarily have networking capabilities.

Figure 2:
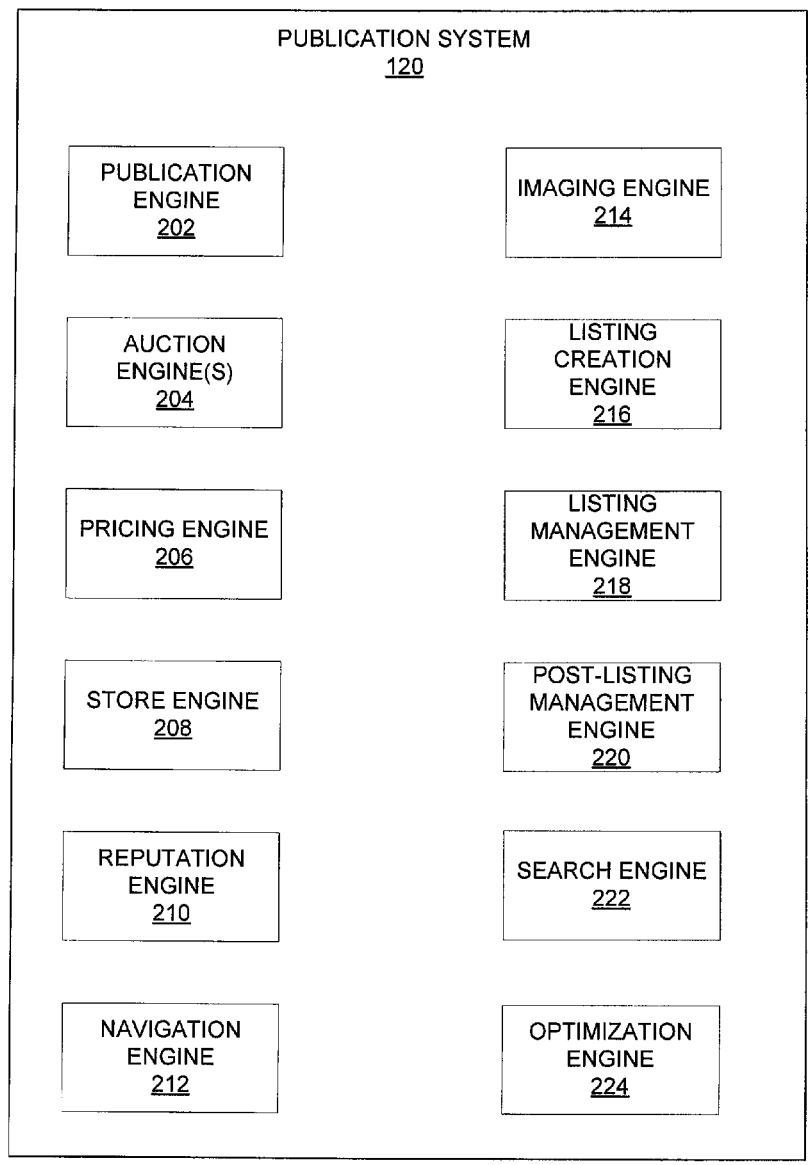
FIG. 2 is a block diagram illustrating an example embodiment of a publication system.

Referring now to FIG. 2, an example block diagram illustrating multiple components that, in one embodiment, are provided within the publication system 120 of the networked system is shown. In this embodiment, the publication system 120 is a marketplace system where items (e.g., goods or services) may be offered for sale. The publication system 120 may be hosted on dedicated or shared server machines (not shown) that are communicatively coupled to enable communications between the server machines. The multiple components themselves are communicatively coupled (e.g., via appropriate interfaces), either directly or indirectly, to each other and to various data sources, to allow information to be passed between the components or to allow the components to share and access common data. Furthermore, the components may access the one or more databases 126 via the one or more database servers 124.

The publication system 120 provides a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the publication system 120 may comprise at least one publication engine 202 and one or more auction engines 204 that support auction-format listing and price setting mechanisms (e.g., English, Dutch, Chinese, Double, Reverse auctions, etc.).

A pricing engine 206 supports various price listing formats. One such format is a fixed-price listing format (e.g., the traditional classified advertisement-type listing or a catalog listing). Another format comprises a buyout-type listing. Buyout-type listings (e.g., the Buy-It-Now (BIN) technology developed by eBay Inc., of San Jose, Calif.) may be offered in conjunction with auction-format listings and allow a buyer to purchase goods or services, which are also being offered for sale via an auction, for a fixed price that is typically higher than a starting price of an auction for an item.

A store engine 208 allows a seller to group listings within a "virtual" store, which may be branded and otherwise personalized by and for the seller. Such a virtual store may also offer promotions, incentives, and features that are specific and personalized to the seller. In one example, the seller may offer a plurality of items as Buy-It-Now items in the virtual store, offer a plurality of items for auction, or a combination of both.

A reputation engine 210 allows users that transact, utilizing the networked system 102, to establish, build, and maintain reputations. These reputations may be made available and published to potential trading partners. Because the publication system 120 supports person-to-person trading between unknown entities, in accordance with one embodiment, users may otherwise have no history or other reference information whereby the trustworthiness and credibility of potential trading partners may be assessed. The reputation engine 210 allows a user, for example through feedback provided by one or more other transaction partners, to establish a reputation within the network-based marketplace over time. Other potential trading partners may then reference the reputation for purposes of assessing credibility and trustworthiness.

Navigation of the network-based marketplace may be facilitated by a navigation engine 212. For example, a browse module (not shown) of the navigation engine 212 allows users to browse various category, catalog, or inventory data structures according to which listings may be classified within the publication system 120. Various other navigation applications within the navigation engine 212 may be provided to supplement the browsing applications.

In order to make listings available via the networked system 102 as visually informing and attractive as possible, the publication system 120 may include an imaging engine 214 that enables users to upload images for inclusion within publications and to incorporate images within viewed listings. The imaging engine 214 may also receive image data from a user as a search query and utilize the image data to identify an item depicted or described by the image data.

A listing creation engine 216 allows users (e.g., sellers) to conveniently author listings of items. In one embodiment, the listings pertain to goods or services that a user (e.g., a seller) wishes to transact via the publication system 120. In other embodiments, a user may create a listing that is an advertisement or other form of publication.

A listing management engine 218 allows the users to manage such listings. Specifically, where a particular user has authored or published a large number of listings, the management of such listings may present a challenge. The listing management engine 218 provides a number of features (e.g., auto-relisting, inventory level monitors, etc.) to assist the user in managing such listings.

A post-listing management engine 220 also assists users with a number of activities that typically occur post-listing. For example, upon completion of an auction facilitated by the one or more auction engines 204, a seller may wish to leave feedback regarding a particular buyer. To this end, the post-listing management engine 220 provides an interface to the reputation engine 210 allowing the seller to conveniently provide feedback regarding multiple buyers to the reputation engine 210. Another post-listing action may be shipping of sold items whereby the post-listing management engine 220 may assist in printing shipping labels, estimating shipping costs, and suggesting shipping carriers.

A search engine 222 performs searches for publications in the networked system 102 that match a query. In example embodiments, the search engine 222 comprises a search module (not shown) that enables keyword searches of publications published via the publication system 120. In a further embodiment, the search engine 222 may take an image received by the imaging engine 214 as an input for conducting a search. The search engine 222 takes the query input and determines a plurality of matches from the networked system 102 (e.g., publications stored in the database 126). The matches are provided to an optimization engine 224 for personalized optimization in accordance with example embodiments described herein. It is noted that the functions of the search engine 222 may be combined with the navigation engine 212.

The optimization engine 224 receives the matches from the search engine 222 and applies an optimization process to the matches to create a personalized result set that is returned to a querying user. The optimization engine 224 will be discussed in more detail in connection with FIG. 3 below.

Although the various components of the publication system 120 have been defined in terms of a variety of individual modules and engines, a skilled artisan will recognize that many of the items can be combined or organized in other ways and that not all modules or engines need to be present or implemented in accordance with example embodiments. Furthermore, not all components of the marketplace system 120 have been included in FIG. 2. In general, components, protocols, structures, and techniques not directly related to functions of exemplary embodiments (e.g., dispute resolution engine, loyalty promotion engine, personalization engines, etc.) have not been shown or discussed in detail. The description given herein simply provides a variety of exemplary embodiments to aid the reader in an understanding of the systems and methods used herein.

Figure 3:
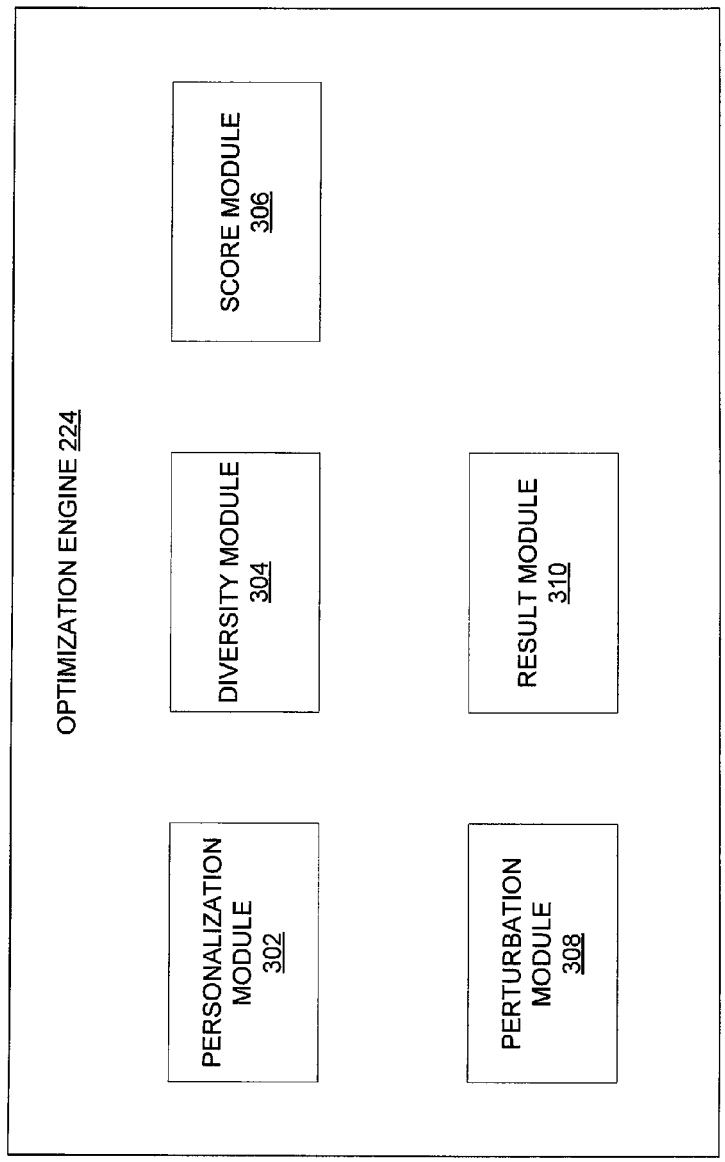
FIG. 3 is a block diagram illustrating an example embodiment of an optimization engine.

FIG. 3 is a block diagram illustrating an example embodiment of the optimization engine 224. The optimization engine 224 performs personalized optimization of matches to a search query in order to return an optimized result set to that is personalized for the querying user. To that end, the optimization engine 224 comprises a personalization module 302, a diversity module 304, a score module 306, a perturbation module 308, and a result module 310. One or more of the modules may be implemented in accordance with example embodiments.

Figure 4A:
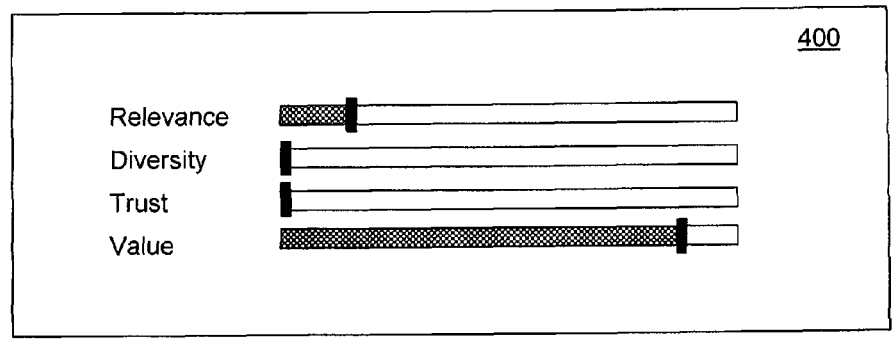
FIGS. 4a and 4b illustrate examples of multi-dimensional personalization interfaces.

The personalization module 302 is configured to manage optimization preferences for a user. In example embodiments, the personalization module 302 provides an interface to the user that comprises preference input fields or selectors. In one embodiment, the interface may include multiple linear sliding scales whereby the user may move a slider for a scale to a particular position to indicate a value to attribute to an optimization factor. An example of a sliding scale interface 400 is shown in FIG. 4a. In the present example, the optimization factors comprise relevance, diversity, trust, and value. Alternative embodiments may contemplate other combinations of optimization factors or a different number of optimization factors. A combination of the values for the sliding scale will result in 100% of a total value. For example, if the total value is 100 (or some factor of 100 such as 1), then the user may assign a relevance score to 30, a diversity score to zero, a trust score to zero, and a value score to 70. The user is prevented from assigning more than the total value. These assigned factor values indicate that the user prefers search results in a result set that are mainly lowest in price and is not so concerned with diversity in information presented in the result set or in trustworthiness of the information source (e.g., seller) of the result set. If movement of the sliding scale results in the total value exceeding 100, one or more of the other sliding scales may be reduced. Alternatively, the user may not be allowed to move a sliding scale beyond a remainder of the total value. As such, the optimization factors are interrelated and an adjustment in one factor may require an adjustment in another factor.

Figure 4B:
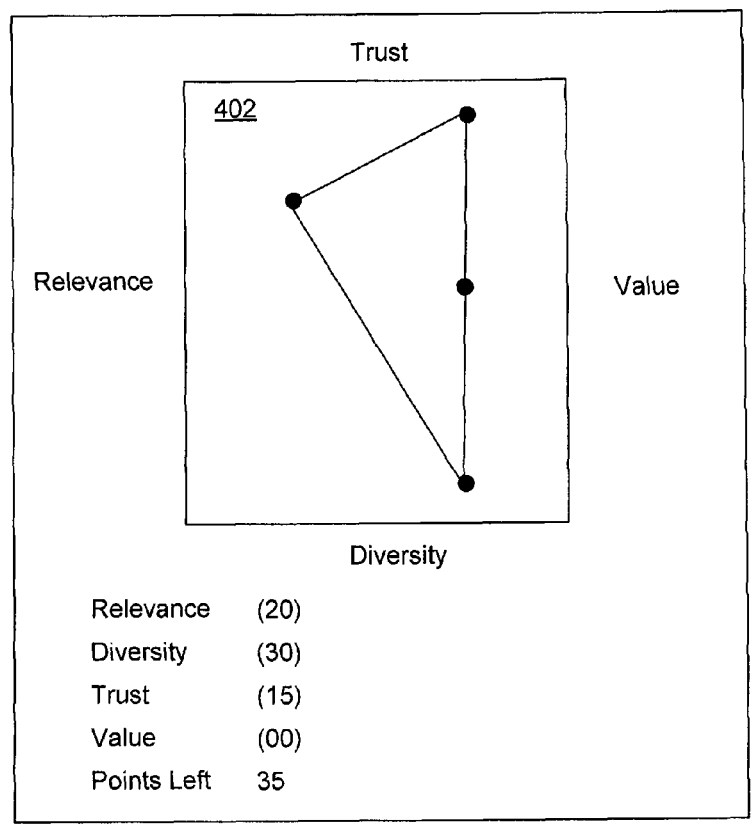

In another example, the personalization module 302 may provide a radar chart 402 as shown in FIG. 4b. The radar chart 402 is a visual indicator of the optimization factors and their relationship to each other shown graphically. As such, a shape of the radar chart 402 indicates a ranking function that will be applied to the matches. The user may drag nodes of the radar chart 402 to adjust their preference. The position of the node will indicate a value assigned to the optimization factor. For example, a relevance factor has a factor value of 20, a diversity factor has a factor value of 30, and a trust factor has a factor value of 15 with 35 points left to assign. In a further embodiment, a combination of the sliding scales and the radar chart embodiments may be provided in the interface. Alternatively, any form of input interfaces may be used.

In some embodiments, the personalization module 302 may examine a user's past behavior to suggest optimization preferences. The personalization module 302 may review past searches or transactions associated with an account of the user to determine patterns that indicate user preferences. For example, if past transactions indicate that the user typically purchases low costing items from sellers with less than stellar reputation scores, the personalization module 302 may suggest optimization preferences that set the value factor high and the trust factor low. The user may adjust these suggested optimization preferences using the interface (e.g., sliding scale interface 400 or radar chart 402 interface) provided by the personalization module 302.

The optimization preferences may be stored to a user account of the user. Alternatively or additionally, the user may update or provide new preferences each time the user performs a search. In embodiments wherein the user preferences are stored, the personalization module 302 obtains the preferences when a search is initiated and matches are received by the optimization engine 224.

The diversity module 304 determines diverse matches to add to a potential result set. The diversity module 304 may operate when the user preferences indicate a preference for diversity in the potential result set. In one embodiment, the diversity module 304 uses a greedy algorithm to determine a diverse set of matches. For example, a first match (e.g., listing or publication) that is considered to be the best match based on past history may be selected by the diversity module 304 for inclusion in a potential result set. The diversity module 304 then finds a second match that is the most different from the first match and includes the second match in the potential result set. The differences may be based on attributes (e.g., terms in a title, description) for each match. In one embodiment, the diversity module 304 may review terms in the matches and determine a number of terms in common and divides the number of terms in common by a total number of terms. A resulting value close to zero will indicate that the matches are very dissimilar. Subsequently, the diversity module 304 continues to find the most different match from those already selected for the potential result set until a maximum amount of matches are found. The maximum amount of matches may correspond to a maximum number of matches that may be displayed to the user based on the user interface (e.g., first page, first five pages).

The goal of diversity is to show different kinds of matches on a first number of pages of results. The diversity module 304 may look at past history of user activities to associated desirable matches with a given query. User click-through, buying, and bidding behavior may be mined to determine a mapping from queries to features. For example, if users in the past issued a search for "roger federer" and ended up buying t-shirts, collectibles, and rackets, then a mapping may be determined from the query "roger federer" to the features t-shirts, collectibles, rackets with some weights. This query to feature mapping is based on a desirability metric. So if lot of Roger Federer posters are available for sale but none are bought after querying for "roger federer," then the vector for the query "roger federer" may have the feature "poster" with a negative weight. These weights are considered by the diversity module 304 in determining the potential result set.

Diversity or selection may be based on a number of different factors. Different factors determining diversity of a result set may include, for example, a number of sellers, kind of seller, type of items, item availability type (e.g., auction), shipping options, different types of products, payment methods available, and categories of the matches In one embodiment, diversity may be calculated for a result set based on diversity of sellers whose items are present in the match set, diversity of items based on format of the item, and diversity measured in terms of an amount of people whose interested may be satisfied by the matches.

In embodiments where the user preference indicates diversity only (e.g., diversity receives 100% of the user preference value), the potential result set is a final result set that is returned to the user. However, when the user preferences include other preference factors, the score module 306 calculates a score for each match (either from the search engine 222 or from the potential result set determined by the diversity module 304) to determine the final result set. The score takes into consideration the optimization factors (e.g., relevance, value, trust, and diversity) that are indicated by the optimization preference established by the user.

With respect to the optimization factors, trust is based on reputation scores for a seller. Some sellers are more professional, ship faster, have been selling longer, and provide better service than other sellers. Thus, trust and reputation scores (e.g., based on ratings or feedback from other users) associated with publications provided by these sellers are different. As a result, if two items are being sold for the same price by two difference sellers with different reputation scores, buyers are more likely to buy from the seller with the better reputation. A trust score t may be determined, by the score module 306, for each match based on how each match ranks in trust versus the other matches. For example, matches with a reputation score of 100% (positive) may be assigned a trust score t of 1, while matches with a reputation score of 0% may be assigned a trust score t of 0. Matches with reputation scores in-between 0% and 100% may be assigned a proportional (scaled) trust score t. Alternatively, if there are no 0% or 100% reputation scores, the match with the highest reputation score may be assigned a trust score t of 1, the match with the lowest reputation score may be assigned a trust score t of 0, and matches in-between are assigned proportional trust scores t.

Given two exact same items in a match with the same trust score, buyers are more likely to buy the one with a lower price. Therefore, value is a function of a price of an item in the match. If the price of the item is less than the a typical selling price of similar items, then the value proposition for the item is higher and vice versa. In one embodiment, the value proposition for a particular match is computed by the score module 306 by comparing the match's price with other similar items that were bought previously. A value proposition score v associated with each match may be determined. For example, a match that has a price that is significantly lower than historical prices for a similar item may be assigned a value proposition score v of 1. Alternatively, a match that has the least expensive item versus the rest of the matches may be assigned a value proposition score v of 1. On the opposite side of the range, a match that is priced significantly above a historical price for a similar item or is priced the highest among the returned matches may be assigned a value proposition score v of 0. Matches having prices in-between may have proportional value proposition scores v or may be assigned an applicable value proposition scores v based on a comparison with the historical price for the similar item of the match.

With respect to a relevance score r, the score is based on a matches relevance compared to past history. For example, if past users type in "coach" and end up buying handbags and shoes but not sunglasses, then the score module 306 determines that handbags and shoes are more relevant and sunglasses are less relevant. A higher relevance score r may be assigned to the more relevant matches (e.g., matches indicating handbags and shoes) and a lower relevance score r may be assigned to the less relevant matches (e.g., matches indicating sunglasses).

A diversity score s may be determined for each match based on the results generated by the diversity module 304. In one embodiment, the diversity score s may be assigned based on the ranking of the match by the diversity module 304. For example, the first match may receive a diversity score s of 1, the last match may receive a diversity score of 0 and the matches in-between will receive proportional diversity scores s. In an alternative embodiment, the score module 306 may assigned a first match a high diversity score s and any subsequent matches indicating a similar item as in the first match a low diversity score s.

The score module 306 also determines coefficients based on the optimization preferences and applies the coefficients to each respective factor score (t, v, s, and r) for each match. For example, if the user's preferences indicate an optimization value of 30 for relevance, 20 for diversity, 10 for trust, and 40 for value, then a relevance coefficient $\alpha$ is 0.3, a diversity coefficient $\beta$ is 0.2, a trust coefficient $\gamma$ is 0.1, and a value coefficient δ is 0.4. Ideally, a summation of the coefficients is equal to 1. These coefficients are applied to factor scores to obtain a unified score for each match. The calculated scores are unified into a unified score, which is used to rank the matches. Thus, a unified score for a match is calculated as $\alpha r+\beta s+\gamma t+\delta v$. The unified scores may be sorted to derive the final result set with matches having the highest unified scores (e.g., a top 100 of the highest sorted set may be returned).

The perturbation module 308 is configured to determine random matches for inclusion into the final result set. Over time, items associated with query terms may change. If perturbation is not performed, then the final result set may not change, and instead, will keep showing the same results. The perturbation module 308 randomly includes new, recently added, or different items to the final result set. Because the item may be relatively new, the item may not rank highly in terms of relevance or trust and little data may be available for price. However, if the item is never returned in a final result set, then the item may never have a chance of gaining relevance, trustworthiness, or pricing information. As such, the use of perturbation module 308 enhances the result set.

Accordingly, the perturbation module 308 may review the final result set and non-selected matches (e.g., matches not selected for the final result set) and include matches that are relatively new or different from matches in the final result set.

The result module 310 is configured to generate the final result set to be returned to the querying user. To this end, the result module 310 may take the scores from the score module 306 as well as the random matches from the perturbation module 308 and generate the final result set. The result module 310 may transmit the final result set to a device of the querying user.

Figure 5:
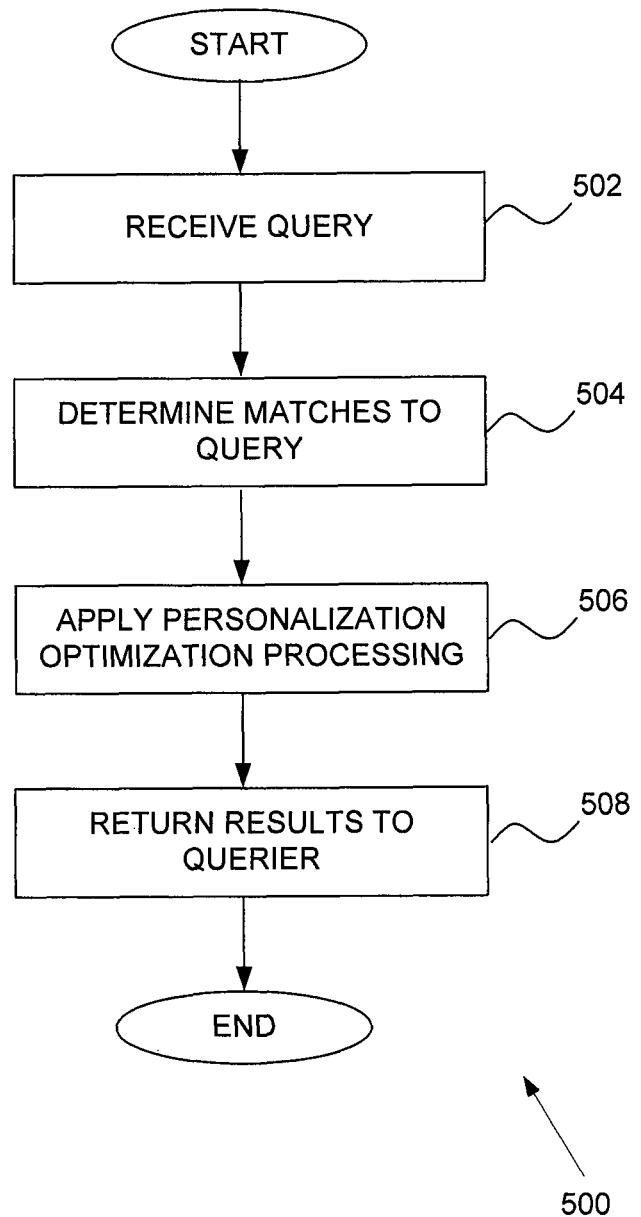
FIG. 5 is a flow diagram of an example high-level method for providing multi-dimensional personalized search results.

FIG. 5 is a flow diagram of an example high-level method 500 for providing multi-dimensional personalized search results. The method 500 may be performed using one or more of the modules and engines described above. In operation 502, a query is received from a device of a user. The query may comprises keywords or an image that received by the search engine 222. The search engine 222 takes the query and performs a search to determine publications or listings that match the query in operation 504. In example embodiments, the search engine 222 searches the networked system 102. In other embodiments, the search engine 222 may search any information repository on the network 104.

In operation 506, personalization optimization processing is performed by the optimization engine 224. In example embodiments, the matches determined by the search engine 222 are provided to the optimization engine 224 so that optimization preferences of the user may be applied. The personalized optimization process will be discussed in further detail in connection with FIG. 6 below.

The final result set is returned to the querying user in operation 508. Accordingly, the optimization engine 224 or the search engine 222 transmits the final result set to the device of the querying user.

Figure 6:
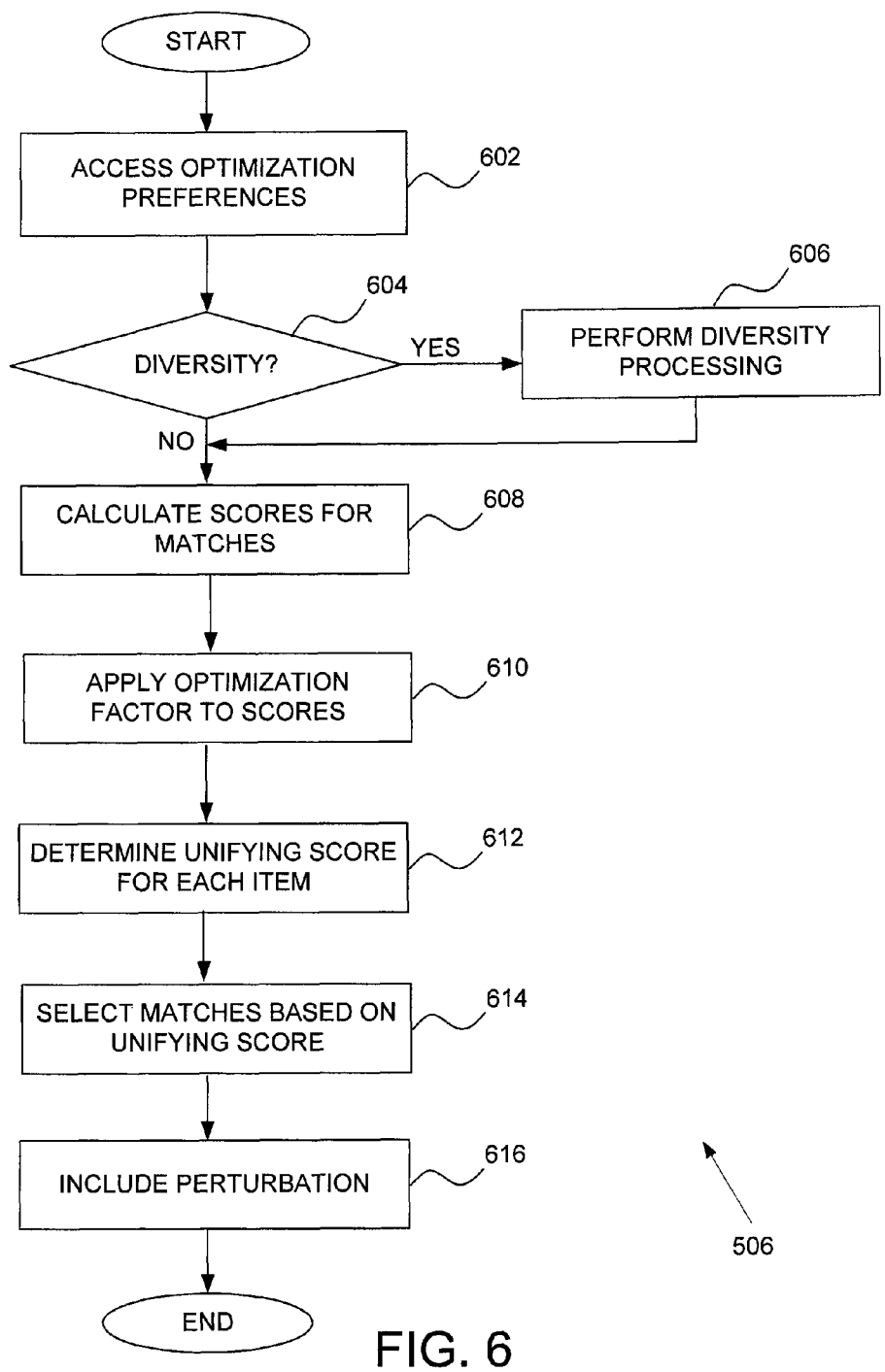
FIG. 6 is a flow diagram of an example high-level method for personalization optimization.

FIG. 6 is a flow diagram of an example high-level method (e.g., operation 506) for personalized optimization processing. In example embodiments, the search results (e.g., matches) determined by the search engine 222 are ranked, sorted, and selected to be included in the final result set according to user optimization preferences.

In operation 602, the user's optimization preferences are accessed by the personalization module 302. In some embodiments, the personalization module 302 accesses the user account of the querying user to retrieve the pre-established user preferences. In other embodiments, the user preferences may be received during the same session as the query.

For example, the user may provide user preferences immediately before or with the query. Further still, the user may adjust the optimization preferences upon receiving a final result set from a query and resend the query with the adjusted optimization preferences. In this situation, the result set may be re-determined using the adjustments.

A determination is made as to whether diversity is an indicated user preference in operation 604. If diversity is indicated as a user preference, then in operation 606, diversity processing is performed. Diversity processing will generate a potential result set that varies in publications. Operation 606 will be discussed in more detail in connection with FIG. 7.

In operation 608, scores for each publication are determined by the score module 306. In accordance with one embodiment, the score module 306 determines a relevance score, a diversity score, a trust score, and a value score for each publication or match (referred to as "factor scores").

In operation 610, the score module 306 applies optimization factors based on the user optimization preferences to the scores calculated in operation 608. In example embodiments, the score module 306 determines factor coefficients based on the optimization preferences and applies the factor coefficients to each respective factor score for the publication. For example, if the user's preferences indicate an optimization value of 30 for relevance, 20 for diversity, 10 for trust, and 40 for value, then a relevance coefficient $\alpha$ is 0.3, a diversity coefficient $\beta$ is 0.2, a trust coefficient $\gamma$ is 0.1, and a value coefficient $\delta$ is 0.4. These coefficients are applied to the factor scores.

A unifying score for each match is then determined in operation 612. The unifying score may be a summation of each optimization factor coefficient times its corresponding factor score for each match. As such, the unifying scores provide a ranking that is based on a linear combination metric of relevance, diversity, trust, and value. Based on the unifying score, matches with the highest score are selected in operation 614 by the result module 310. The matches may be added to a final result set.

In operation 616, perturbation results may be added to the result set by the perturbation module 308. In example embodiments, the perturbation module 308 may find one or more publications that are new or recently added (e.g., to a particular category). Alternatively, the perturbation module 308 may identify one or more publications that describe an item that is new or recently added. The matches identified by the perturbation module 308 are matches (e.g., perturbation results) which would otherwise not be included in the result set due to the relative newness of the publications.

Figure 7:
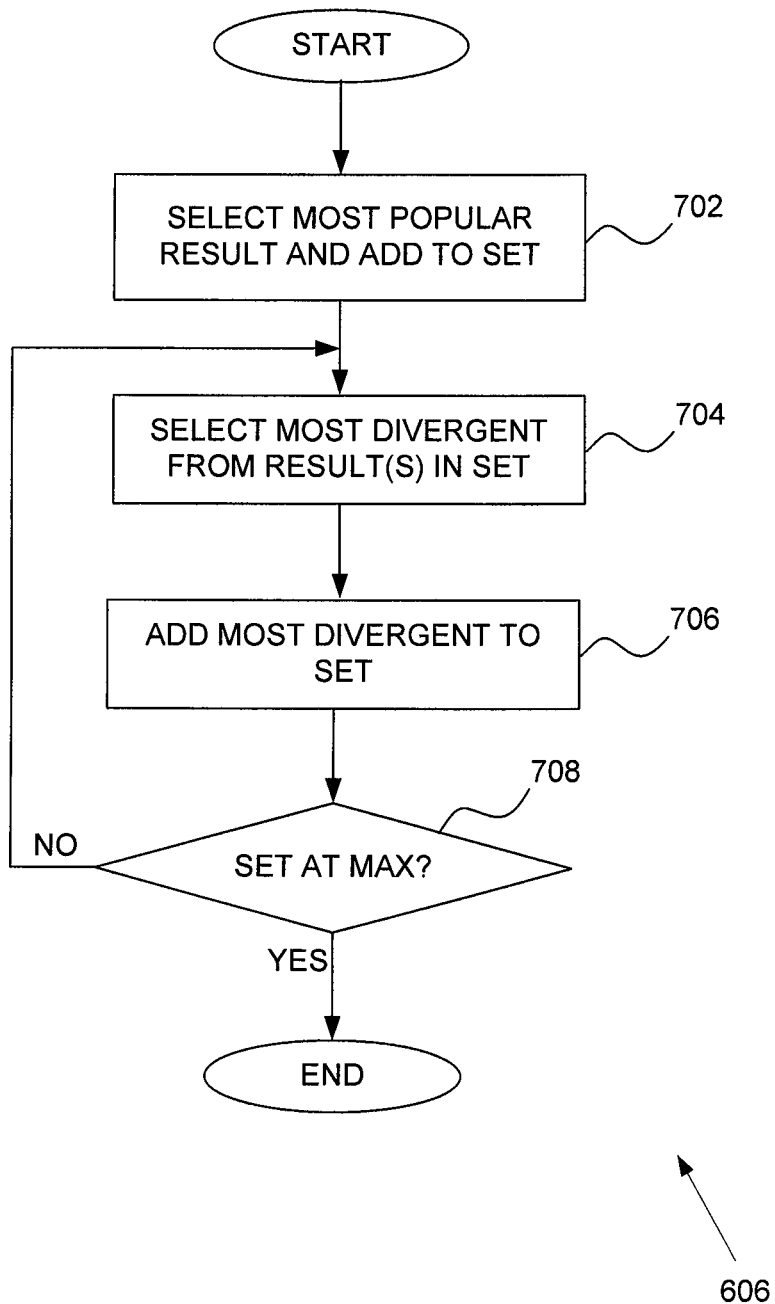
FIG. 7 is a flow diagram of an example high-level method for applying diversity to the search results.

FIG. 7 is a flow diagram of an example high-level method (e.g., operation 604) illustrating diversity processing. In example embodiments, the diversity module 304 determines diverse matches to add to a potential result set when the user preferences indicate a preference for diversity in the potential result set. In one embodiment, the diversity module 304 uses a greedy algorithm to determine a diverse set of matches.

In operation 702, the diversity module 304 selects a first match (e.g., listing or publication) that is considered to be the best or most popular match based on past history and added to a potential result set. In operation 704, the diversity module 304 then selects a second match that is the most different from the first match. The second match is included to the potential result set in operation 706. The differences may be based on attributes (e.g., terms in a title, description) for each match. If in operation 708, a determination is made that the potential result set has not reached a maximum number of matches, the method returns to operation 704.

In some embodiments, there may be no maximum number. Instead all matches are ranked by the diversity module 304. That is the first match is ranked highest with each subsequent match determined being a lower ranking. The ranking may then be used in the calculating of the diversity score. For example, the first match may have a diversity score of one and the last match may have a diversity score of zero. The matches in-between will have diversity scores that are proportional between one and zero.

Modules, Components, and Logic

Additionally, certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations as described herein. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time. The processor may be temporary configured or permanently configured to perform relevant operations. Whether temporarily configured or permanently configured, such processors may constitute processor-implemented modules that operate to perform one or more operations or functions.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Example Machine Architecture and Machine-readable Medium

Figure 8:
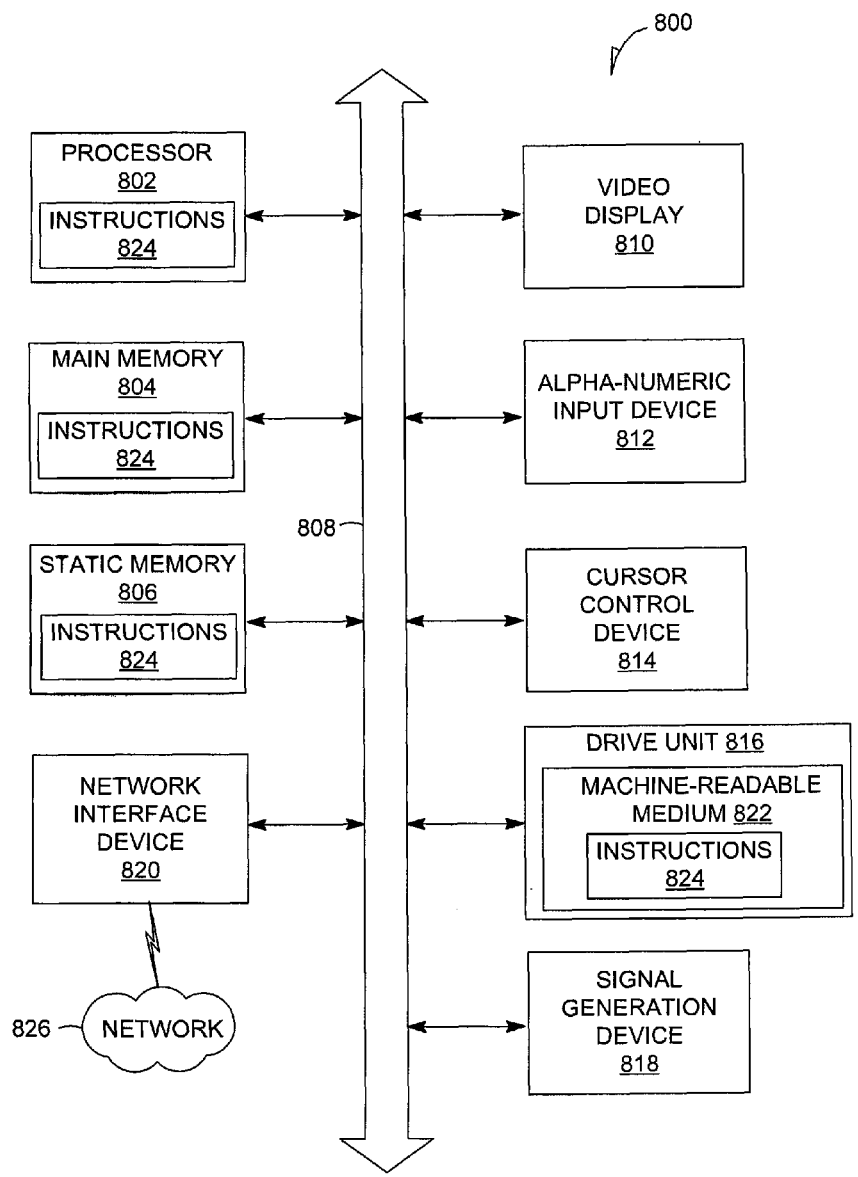
FIG. 8 is a simplified block diagram of a machine in an example form of a computing system within which a set of instructions for causing the machine to perform any one or more of the methodologies discussed herein may be executed.

With reference to FIG. 8, an example embodiment extends to a machine in the example form of a computer system 800 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 may include a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). In example embodiments, the computer system 800 also includes one or more of an alpha-numeric input device 812 (e.g., a keyboard), a user interface (UI) navigation device or cursor control device 814 (e.g., a mouse), a disk drive unit 816, a signal generation device 818 (e.g., a speaker), and a network interface device 820.

Machine-readable Storage Medium

The disk drive unit 816 includes a machine-readable storage medium 822 on which is stored one or more sets of instructions 824 and data structures (e.g., software instructions) embodying or used by any one or more of the methodologies or functions described herein. The instructions 824 may also reside, completely or at least partially, within the main memory 804 or within the processor 802 during execution thereof by the computer system 800, with the main memory 804 and the processor 802 also constituting machine-readable media.

While the machine-readable storage medium 822 is shown in an example embodiment to be a single medium, the term "machine-readable storage medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media. Specific examples of machine-readable storage media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

Transmission Medium

The instructions 824 may further be transmitted or received over a communications network 826 using a transmission medium via the network interface device 820 and utilizing any one of a number of well-known transfer protocols (e.g., HTTP). Examples of communication networks include a local area network (LAN), a wide area network (WAN), the Internet, mobile telephone networks, POTS networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
providing a user interface that allows a user to establish optimization preferences used to personalize results based on a query input by the user for item listings containing an item that matches the query, the optimization preferences including a plurality of interrelated optimization factors and a value assigned by the user to each interrelated optimization, a sum total of the value for each interrelated optimization factor equaling a total allowed value assigned to the plurality of interrelated optimization factors, the plurality of interrelated optimization factors including a relevance factor that is applied to a relevance score;
receiving the optimization preferences via the user interface;
receiving the query input by the user that triggers a search of a publication system comprising a plurality of item listings for the item listings that contain the item that matches the query;
performing the search of the publication system to identify the item listings containing the item that matches the query;
calculating a factor score corresponding to each optimization factor for each item listing resulting from the search, the factor score including a relevance score that is based on relevance of each of the item listing compared to past history of interactions by other users with item listings containing similar item types as those in each of the item listings resulting from the search of the publication system that was triggered by the query input by the user; and
applying, using at least one processor of a machine, the optimization preferences to the factor score for each of the item listings resulting from the search of the publication system to generate a personalized result set of item listings, the applying including applying the relevance factor to the relevance score.

2. The method of claim 1, wherein the providing of the user interface comprises:
accessing historical data associated with the user including past transactions and searches performed by the user;
determining a default set of values for the interrelated optimization factors based on the historical data including past transactions and searches performed by the user; and
providing the default set of values on the user interface.

3. The method of claim 1, further comprising adding at least one perturbation match of a further item listing that contains the item that matches the query to the personalized result set, the at least one perturbation match of the further item listing being a match that is lacking in one or more optimization factors due to newness.

4. The method of claim 1, wherein the total allowed value is a factor of 100 and a summation of the values assigned to the interrelated optimization factors equals the factor of 100.

5. The method of claim 1, wherein the user interface comprises a plurality of sliding scales on which the user indicates the values that are the portion of the total allowed value assigned to interrelated optimization factors, each of the plurality of sliding scales being one optimization factor of the interrelated optimization factors.

6. The method of claim 1, wherein the deriving of the factor scores comprises determining, for each of the item listings containing the item that matches, a trust score that is based on reputation scores corresponding to feedback provided by the other users.

7. The method of claim 1, wherein the applying of the optimization preferences comprises:
- determining a factor coefficient for each interrelated optimization factor, the factor coefficient corresponding to the value assigned by the user to each interrelated optimization factor;
- applying the factor coefficients for each interrelated optimization factor to the calculated factor scores for each of the item listings containing the item that matches; and
- determining a unifying score for each of the item listings containing the item that matches, the personalized result set being the item listings with highest unifying scores.

8. The method of claim 1, wherein the deriving of the factor scores comprises determining a diversity score for each of the item listings containing the item that matches, the deriving of the diversity score comprising:
- selecting a most popular match and placing the most popular match in a potential set;
- continually determining a next most divergent match from results in the potential set and placing the next most divergent match in the potential set until a limit is reached;
- assigning a highest diversity score to the most popular match; and
- assigning proportionally decreasing diversity scores for a remainder of the matches in the potential set.

9. A non-transitory machine-readable medium storing instructions which, when executed by the at least one processor of a machine, causes the machine to perform operations comprising:
- providing a user interface that allows a user to establish optimization preferences used to personalize results based on a query input by the user for item listings containing an item that matches the query, the optimization preferences including a plurality of interrelated optimization factors and a value assigned by the user to each interrelated optimization factor of the plurality of interrelated optimization factors, a sum total the value for each interrelated optimization factor equaling a total allowed value assigned to the plurality of interrelated optimization factors, the plurality of interrelated optimization factors including a relevance factor that is applied to a relevance score;
- receiving the optimization preferences via the user interface;
- receiving the query input by the user that triggers a search of a publication system comprising a plurality of item listings for the item listings that contain the item that matches the query;
- performing the search of the publication system to identify the item listings containing the item that matches the query;
- calculating a factor score corresponding to each optimization factor for each item listing resulting from the search, the factor score including a relevance score that is based on relevance of each of the item listing compared to past history of interactions by other users with item listings containing similar item types as those in each of the item listings resulting from the search of the publication system that was triggered by the query input by the user; and
- applying the optimization preferences to the factor score for each of the item listings resulting from the search of the publication system to generate a personalized result set of item listings, the applying including applying the relevance factor to the relevance score.

10. The non-transitory machine-readable medium of claim 9, wherein the providing of the user interface comprises:
- accessing historical data associated with the user including past transactions and searches performed by the user;
- determining a default set of values for the interrelated optimization factors based on the historical data including past transactions and searches performed by the user; and
- providing the default set of values on the user interface.

11. The non-transitory machine-readable medium of claim 9, further comprising adding at least one perturbation match of a further item listing that contains the item that matches the query to the personalized result set, the at least one perturbation match of the further item listing being a match that is lacking in one or more optimization factors due to newness.

12. The non-transitory machine-readable medium of claim 9, wherein the user interface comprises a plurality of sliding scales on which the user indicates the values that are the portion of the total allowed value assigned to interrelated optimization factors, each of the plurality of sliding scales being one optimization factor of the interrelated optimization factors.

13. The non-transitory machine-readable medium of claim 9, wherein the applying of the optimization preferences comprises:
- applying factor coefficients to the calculated factor scores for each of the item listings containing the item that matches, the factor coefficients each corresponding to a respective value of the values assigned to each of the interrelated optimization factors; and
- determining a unifying score for each of the item listings containing the item that matches, the personalized result set being matches with highest unifying scores.

14. The non-transitory machine-readable medium of claim 9, wherein the deriving of the factor scores comprises determining a diversity score for each of the item listings containing the item that matches, the determining of the diversity score comprising:
- selecting a most popular match and placing the most popular match in a potential set;
- continually determining a next most divergent match from results in the potential set and placing the next most divergent match in the potential set until a limit is reached;
- assigning a highest diversity score to the most popular match; and
- assigning proportionally decreasing diversity scores for a remainder of the matches in the potential set.

15. A system comprising:
at least a processor of a machine, comprising:
- a personalization module configured to provide a user interface that allows a user to establish optimization preferences used to personalize results based on a query input by the user for item listings containing an item that matches the query, the optimization preferences including a plurality of interrelated optimization factors and a value assigned by the user to each interrelated optimization factor of the plurality of interrelated optimization factors, a sum total the value for each interrelated optimization factor equaling a total allowed value assigned to the plurality of interrelated optimization factors and configured to receive the optimization preferences via the user interface, the plurality of interrelated optimization factors including a relevance factor that is applied to a relevance score;
- a search engine to receive the query input by the user that triggers a search of a publication system comprising a plurality of item listings for item listings that contains the item that matches the query, and to perform the search of the publication system to identify the item listings containing the item that matches the query; and a score module configured to:

calculate a factor score for each item listing resulting from the search, the factor score including a relevance score that is based on relevance of each of the item listing compared to past history of interactions by other users with item listings containing similar item types as those in each of the item listings resulting from the search of the publication system that was triggered by the query input by the user, and apply the optimization preferences to the factor score for each of the item listings resulting from the search of the publication system to generate a personalized result set of item listings.

16. The system of claim 15, further comprising a perturbation module configured to add at least one perturbation match of a further item listing that contains the item that matches the query to the personalized result set, the at least one perturbation match of the further item listing being a match that is lacking in one or more optimization factors due to newness.

17. The system of claim 15, wherein the scoring module is further configured to:

apply factor coefficients to the factor scores for each of the item listings containing the item that matches, the factor coefficients each corresponding to a respective value of the values assigned to each of the interrelated optimization factors; and determine a unifying score for each of the item listings containing the item that matches, the personalized result set being the matches with highest unifying scores.

18. The system of claim 17, further comprising a diversity module configured to determine a diversity score for each match by selecting a most popular match and placing the most popular match in a potential set, continually determining a next most divergent match from results in the potential set and placing the next most divergent match in the potential set until a limit is reached, assigning a highest diversity score to the most popular match, and assigning proportionally decreasing diversity scores for a remainder of the matches in the potential set.

19. The method of claim 1, wherein the user interface comprises a radar chart on which the user indicates the values that are the portion of the total allowed value assigned to the interrelated optimization factors.

20. The method of claim 1, wherein the deriving of the factor scores comprises determining, for each of the item listings containing the item that matches, a value proposition score that is based on historical prices for similar items.

* * * * *

UNITED STATES PATENT AND TRADEMARK OFFICE
CERTIFICATE OF CORRECTION

PATENT NO. : 9,195,758 B2  
APPLICATION NO. : 13/278912  
DATED : November 24, 2015  
INVENTOR(S) : Parikh et al.

Page 1 of 1

It is certified that error appears in the above-identified patent and that said Letters Patent is hereby corrected as shown below:

In the Claims

In column 16, line 66, in Claim 15, after "for", insert --the--, therefor

In column 16, line 66, in Claim 15, delete "contains" and insert --contain--, therefor Signed and Sealed this
Twenty-second Day of March, 2016

Michelle K. Lee
*Director of the United States Patent and Trademark Office*